United States Patent [19]

Dull et al.

[11] Patent Number: 5,003,740
[45] Date of Patent: Apr. 2, 1991

[54] OPEN OFFICE SYSTEM PARTITION PANEL ASSEMBLY

[75] Inventors: Raymond P. Dull, Spring Lake; Bernard R. Lavas; William D. Baxter, both of Muskegon, all of Mich.

[73] Assignee: The Shaw-Walker Company, Muskegon, Mich.

[21] Appl. No.: 275,718

[22] Filed: Nov. 23, 1988

[51] Int. Cl.⁵ .................................................. E04H 1/06
[52] U.S. Cl. .................................... 52/239; 52/36; 52/126.4; 52/221
[58] Field of Search .............. 52/239, 220, 221, 126.3, 52/126.4, 36, 584

[56] References Cited

U.S. PATENT DOCUMENTS

| | | | |
|---|---|---|---|
| 2,766,855 | 10/1956 | Johnson et al. | 52/220 |
| 3,408,781 | 11/1968 | Pollock | 52/126.4 |
| 3,529,389 | 9/1970 | Wilkins | 52/221 |
| 3,834,093 | 9/1974 | Tacke et al. | |
| 3,844,079 | 10/1974 | Karrip | |
| 3,871,153 | 3/1975 | Birum, Jr. | 52/239 |
| 3,892,095 | 7/1975 | Vankuik et al. | |
| 4,060,294 | 11/1977 | Haworth et al. | 52/239 |
| 4,104,838 | 8/1978 | Hage et al. | 52/239 |
| 4,144,924 | 3/1979 | Vanden Hoek | |
| 4,213,493 | 7/1980 | Haworth | |
| 4,391,073 | 7/1983 | Mollenkopf et al. | 52/221 |
| 4,682,457 | 7/1987 | Spencer | 52/239 |
| 4,716,692 | 1/1988 | Harper et al. | |
| 4,862,659 | 9/1989 | Wilson et al. | 52/220 |

FOREIGN PATENT DOCUMENTS

| | | | |
|---|---|---|---|
| 1188259 | 3/1965 | Fed. Rep. of Germany | 52/239 |
| 2060022 | 4/1981 | United Kingdom | 52/239 |

Primary Examiner—Michael Safavi
Attorney, Agent, or Firm—Kinzer, Plyer, Dorn, McEachran & Jambor

[57] ABSTRACT

An open office system partition panel assembly including a panel having an outwardly opening wire raceway channel on top with a removable cap to permit wires to be laid in the top raceway channel. End wire raceway channels open away from the core of the panel and each has a panel connector support rail closing its opening. The wire raceway channels form a steel frame of box section strength for the panel and all metal-enclosed, non-snagging wire raceays from the top to the base of the panel. Legs formed as part of the panel base support the panel connector support rails. Wire passageways extend from the panel base to the end wire raceway channels. The panel base has and end section fastened to and supported on each leg. Upper panel connectors facilitate the connection of panels, improve the rigidity of the connection between panels and provide positive locking for the panel connection, both vertically and horizontally. The middle section, which fastens to and is supported on the end sections, may be omitted when electrical wiring is not installed in the panel base. A snap-in divider separates the raceway of the panel base into upper and lower wire conduits.

4 Claims, 4 Drawing Sheets

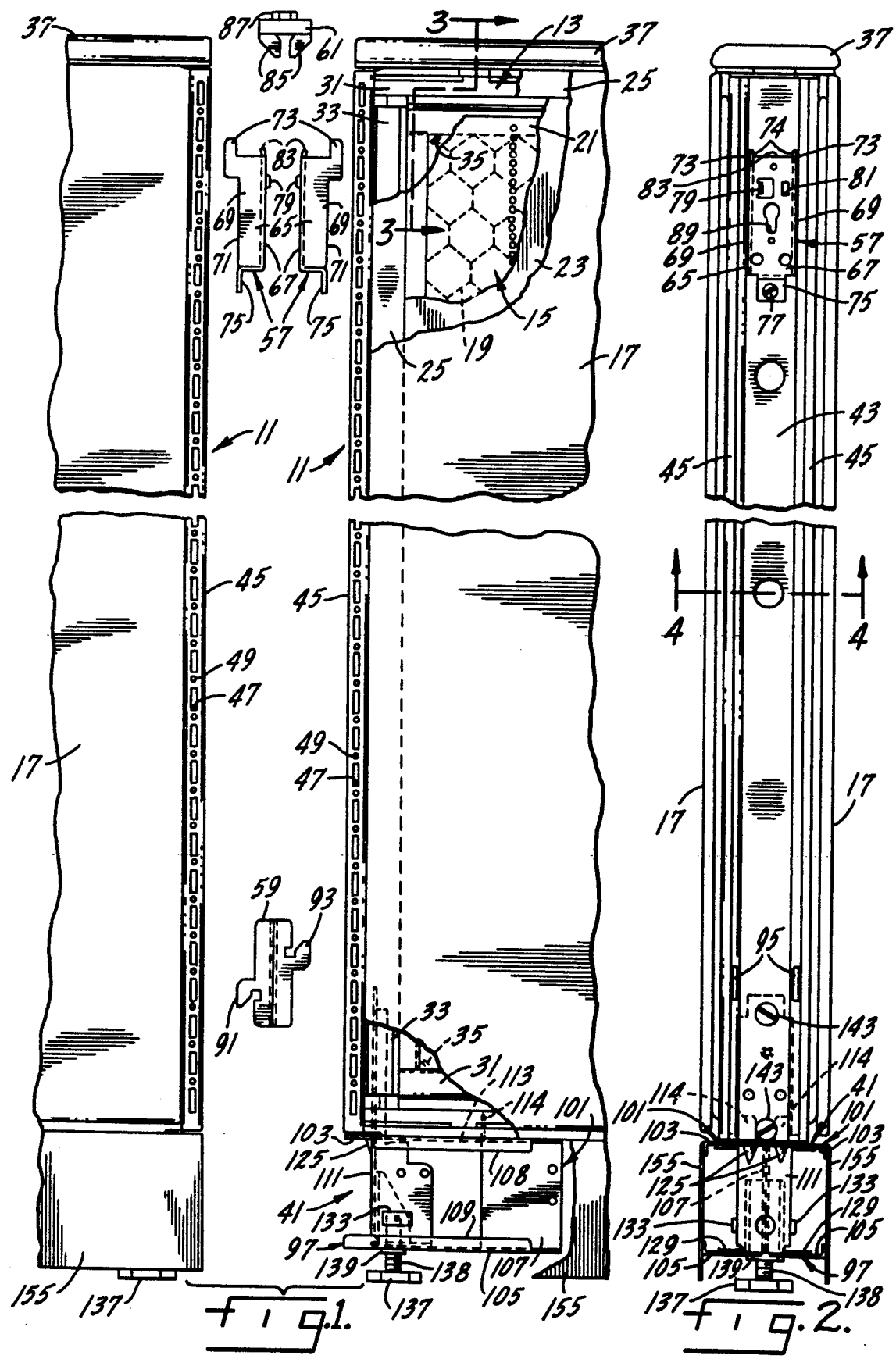

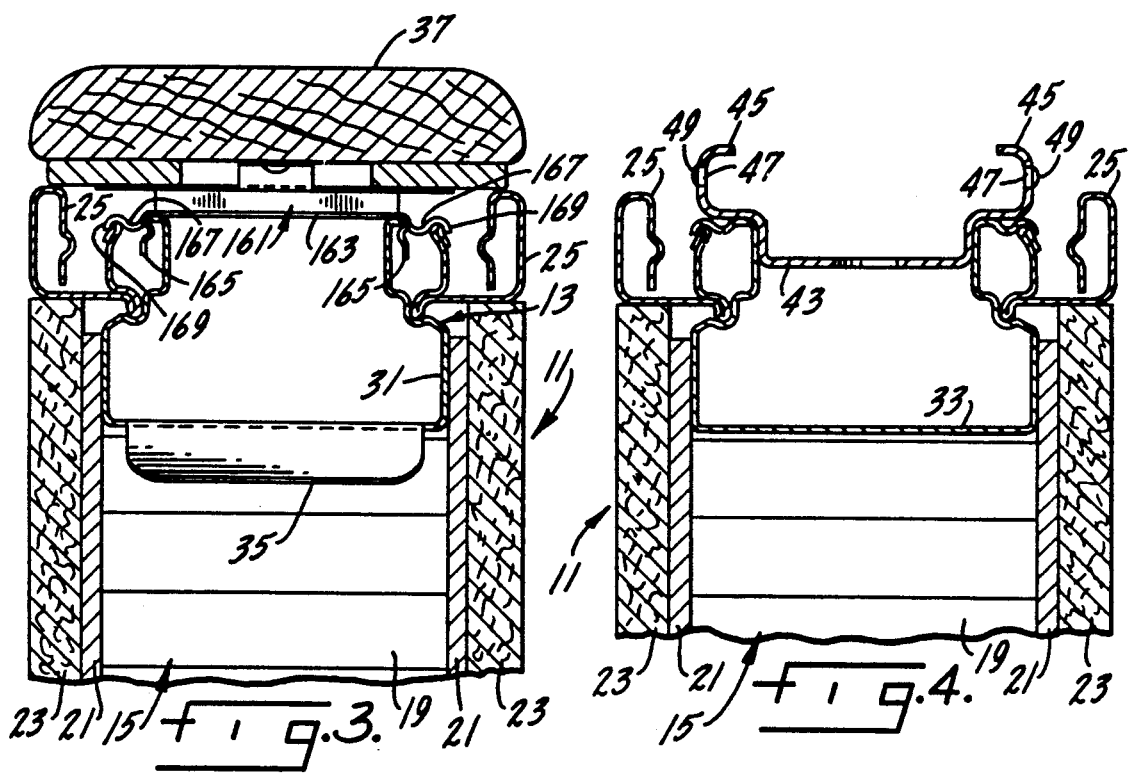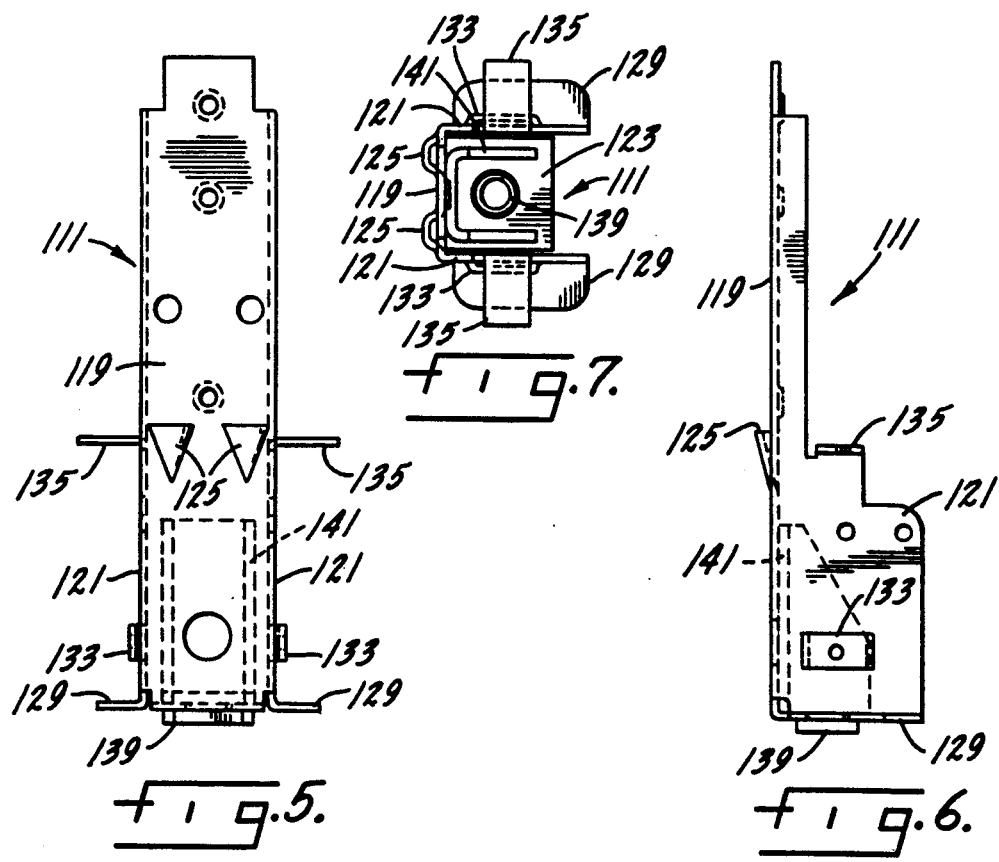

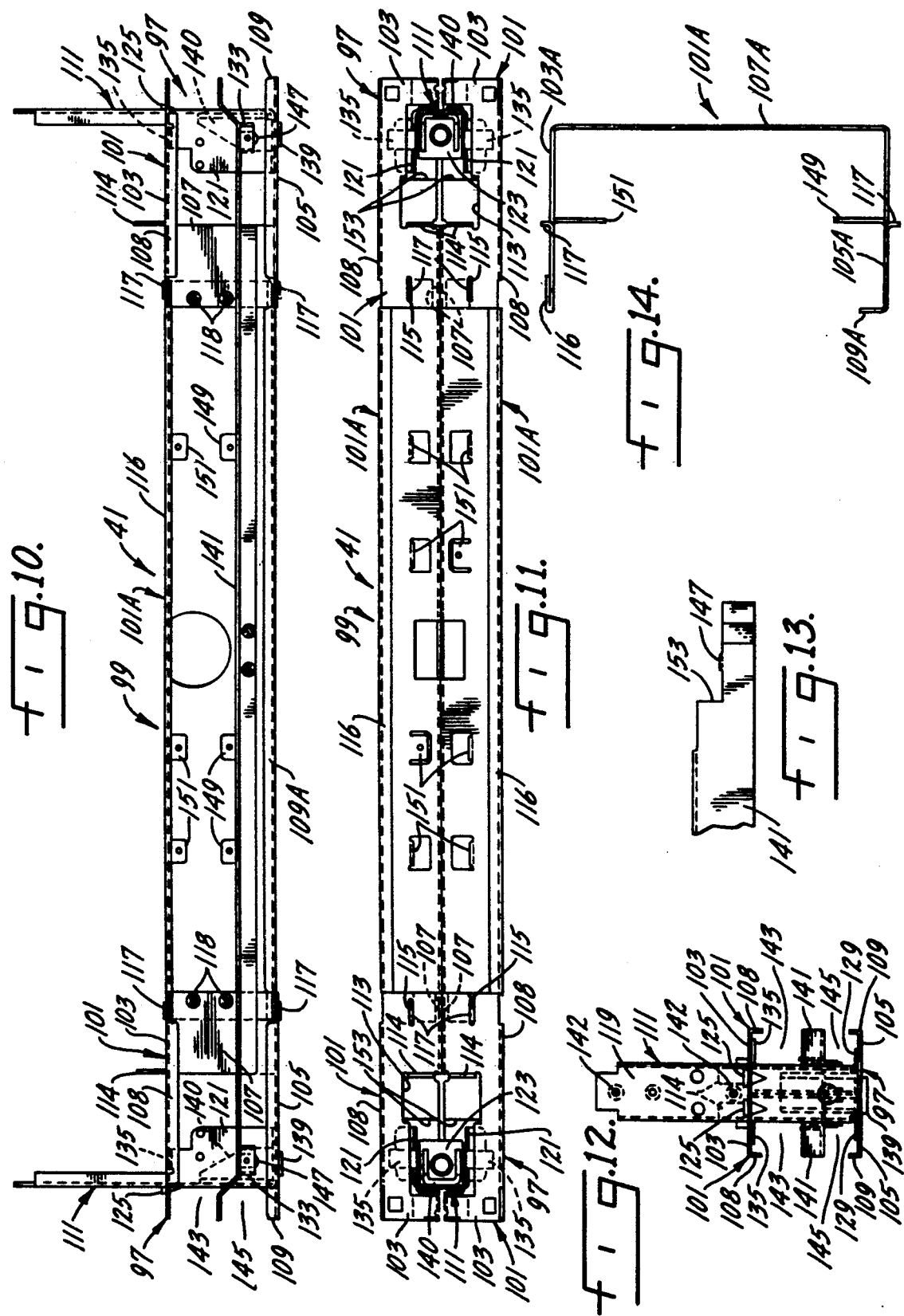

OPEN OFFICE SYSTEM PARTITION PANEL ASSEMBLY

BACKGROUND AND SUMMARY OF THE INVENTION

This invention is concerned with an open office partition system.

An object of this invention is a panel for an open office partition system having a large capacity, easily accessible top channel in which wires can be laid after removal of a top cap.

Another object of this invention is a panel for an open office partition system having a steel frame of box section strength that can be welded together.

Another object of this invention is a panel having a metal frame that provides wire raceways around the top and sides of the panel.

Another object of this invention is a panel having a metal frame that provides all metal-enclosed wire raceways from the top of the panel to the base assembly of the panel.

Another object of this invention is a panel having a metal box-shaped frame with heavy steel rails closing the ends of the vertical channels to provide support for shelf, cabinet and desk brackets and panel connectors.

Another object of this invention is a panel having a metal box frame with intersecting top and side channels forming wire raceways, with non-snagging intersections between the channels.

Another object of this invention is a panel assembly having legs which directly support the panel and also support the heavy steel rails closing the vertical raceways on the ends of the panel.

Another object of this invention is a base for a panel which provides wire pass-throughs from the base assembly to the vertical raceways.

Another object of this invention is a connector for open office partition system panels which facilitates the connection of panels, improves the rigidity of the connection between panels and provides positive locking for the panel connection, both vertically and horizontally.

Other objects of this invention will be found in the following specification, claims and drawings.

BRIEF DESCRIPTION OF THE DRAWINGS

The invention is illustrated more or less diagrammatically in the following drawings wherein:

FIG. 1 is a partial, side elevational view of a pair of partition panels embodying the novel features of this invention shown in an unconnected position, with the connectors shown in an exploded relationship to the panels and one another and some parts broken away for clarity of illustration;

FIG. 2 is an end elevational view of one of the panels of FIG. 1;

FIG. 3 is an enlarged, cross-sectional view taken along line 3—3 of FIG. 1;

FIG. 4 is an enlarged, cross-sectional view taken along line 4—4 of FIG. 2;

FIG. 5 is an enlarged, end elevational view of a leg;

FIG. 6 is a side elevational view of the leg of FIG. 5;

FIG. 7 is a top plan view of the leg of FIG. 5;

FIG. 10 is a side elevational view of a base assembly with a center section installed;

FIG. 11 is a top plan view of the base assembly of FIG. 10;

FIG. 12 is an end elevational view of the base assembly of FIG. 10;

FIG. 13 is a partial top plan view of one end of a base panel wire divider partition; and FIG. 14 is an enlarged, end elevational view of a base panel housing center section of FIG. 10;

Description of the Preferred Embodiments

Figure 8:
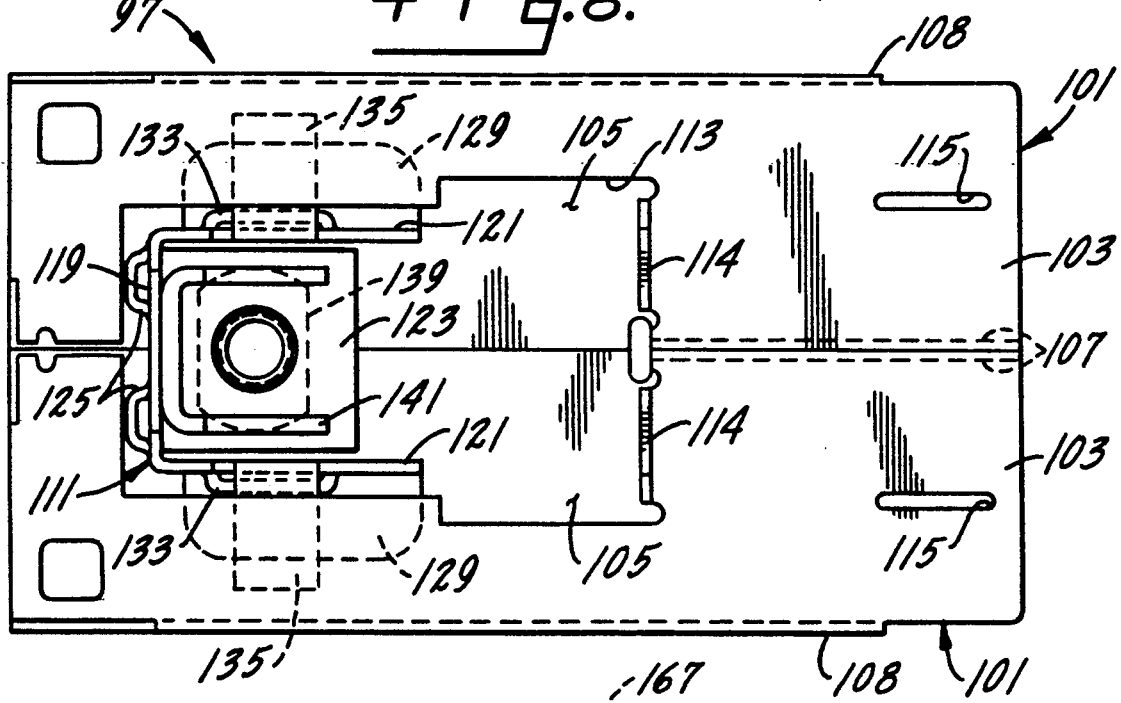
FIG. 8 is an enlarged top plan view of a base end and supporting leg.

FIG. 1 of the drawings shows a pair of partition panels 11 of this invention positioned end to end and ready to be connected with the various connector elements shown in an exploded relationship to one another and to the panels. The partition panel 11 is of the type that is installed in what is called an open office system partition wall, which partition walls are conventionally freestanding and terminate substantially short of the ceiling in the building in which they are installed.

The partition panel 11 of this invention includes a frame 13 surrounding a core 15, with the core and frame normally covered by a decorative covering 17, which may be a fabric or other material suitable as a wall or furniture covering.

The core 15 includes an inner member 19 of honeycombed paper which is covered on both sides by a skin 21, which in this embodiment is a perforated wood fiber hardboard sheet. As is conventional, the skin is attached to the honeycomb inner member through the use of a suitable adhesive. If desired, instead of a perforated hardboard skin, a perforated cold-rolled steel sheet may also be used. For soundproofing purposes, a layer of glass fiber 23 is attached to the exterior sides of the skin 21. The decorative covering 17 is applied to the exterior of the fiberglass and is held by metal fabric retainers 25 to be described hereinafter.

Figure 9:
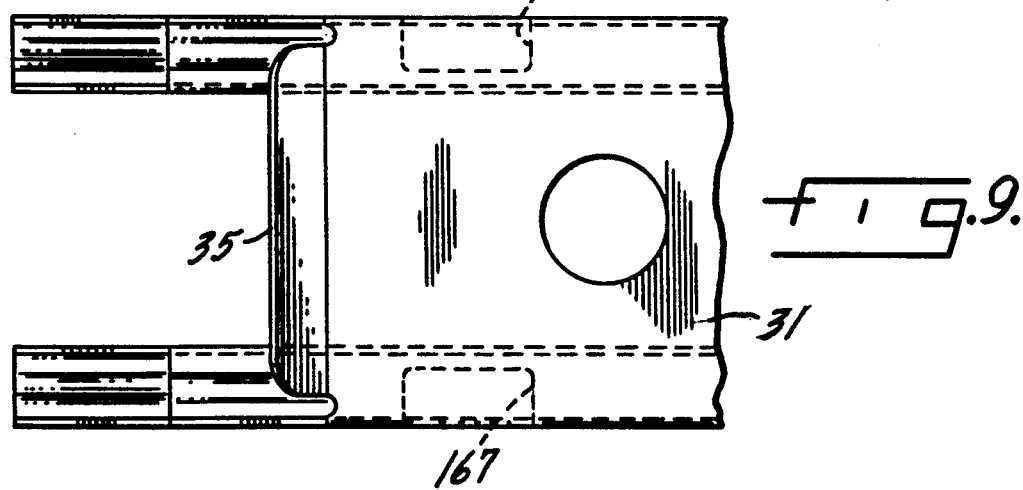
FIG. 9 is an enlarged, partial top plan view of the bottom channel of a panel.

The frame 13 of this panel 11 is formed of rolled strip steel in contrast to frames of previous partition panels which have been made from aluminum extrusions backed up with a tubular steel ring of rectangular cross-section. The rolled strip steel frame of this invention consists of top and bottom channels 31 and end channels 33 which are welded to one another, the top channel being shown in FIG. 3 of the drawings, and the end channels 33 being shown in FIG. 4 of the drawings. All channels are formed as deep, box-shaped structural members providing large capacity raceways for wires. The top and bottom channels 31 are formed with bent tabs 35 at the ends thereof, as shown in FIGS. 1, 3 and 9, which tabs fit into the end channels 33 where the top, bottom and end channels intersect to form raceways that are non-wire snagging. The top channel 31 opens upwardly to permit communication wires to be laid in the channel and is closed by a cap 37. The bottom channel 31 rests on the base assembly 41 and is normally not used as a wire raceway, although it is available for such use.

The end channels 33 open away from the core 15, and they are provided with panel connector support rails 43 closing their side but not top and bottom openings. The panel connector support rails 43 are also rolled from steel sheets of a heavier gauge than that used for the top, bottom and end channels of the frame and are welded to the end channels. Formed integrally with the rails 43 on opposite sides of the panel are flanges 45 which function as standards for shelf, cabinet and desk brackets (not shown), which are conventionally installed between and supported on the panels of an open office partition system. As shown in FIG. 1 of the drawings, the flanges 45 each have a row of aligned slots 47 formed therein, which slots receive the hooks of conventional shelf, cabinet and desk brackets. In order to use conventional shelf brackets, which were designed for use with aluminum extrusions having much greater wall thicknesses than those of the flanges 45 of the rolled steel connector support rails 43 of this invention, outwardly protruding dimples 49 are formed in the flanges between the slots 47. Through use of the protruding dimples, the flange 45 has an effective thickness for supporting shelf, cabinet and desk brackets equivalent to that of the previously used aluminum extrusions.

As can be seen most clearly in the exploded view of FIG. 1 and the end view of FIG. 2, a pair of partition panels 11 can be connected in an end-to-end alignment using a pair of top connectors 57, which are new and are a part of this invention, a bottom connector 59, which is a modified form of a connector which has been used before, and a clamp nut 61 which has also been used before.

Each top connector 57 consists of an elongated body 65 of U-shaped, transverse cross-section having an end wall 67 connecting two side walls 69, with the side walls having opposite end edges 71 which are positioned in contact with the panel connector support end rail 43. An upwardly opening hook 73 extends rearwardly from the end edge 71 of each connector side wall at the upper end thereof to fit into a pair of spaced slots 74 formed in the panel end rail 43. A tab 75 extends inwardly and downwardly from the end wall 67 to engage the panel connector rail 43. An opening (not shown) is provided in the tab to receive a fastener 77, shown in FIG. 2, to attach the tab to the panel connector support end rail 43.

A small rectangular projection 79 extends outwardly from the end wall 67 of each connector 57. A slot 81, complementary in size and shape to the projection 79, is also formed in the end wall of the connector, with the projection and slot being located symmetrically relative to each other about a vertical centerline extending through the end wall of the connector. A rearwardly-bent tab 83 is formed on the top edge of the end wall to receive the jaws 85 of the clamp nut 61.

When the panels 11 are connected together, the end wall 67 of one connector 57 will engage the end wall 67 of the other connector 57, with the projection 79 of one connector fitting into the slot 81 of the opposite connector to align the panels, provide rigidity for the connection and provide positive locking of the connectors, both vertically and horizontally. When the connectors are in contact with each other, the clamp nut 61, which is a commercially-available item manufactured by Simmons Fastener Company, is lowered over the rearwardly-facing tabs 83 and the clamp jaws 85 are brought together by operation of its eccentric nut 87 to hold the connectors together. A keyhole slot 89 is provided in the end wall of the connector 57 for mounting an end cap if the panel is not connected to another panel.

The bottom connector 59 has an H-shaped, transverse cross-section with a pair of downwardly-extending blades 91 on one end and a pair of upwardly-extending blades 93 on the opposite end. At installation, the downwardly-extending blades 91 are inserted in slots 95 formed in the rail 43 of one panel and the other panel is then tilted and mounted on the upwardly-extending blades 93, which also fit in similar slots 95 in the other panel.

The base assembly 41, which is shown in FIGS. 1, 2 and 5 through 14 of the drawings, may be used to support panels that are wired and panels that are not wired. When used with unwired panels, parts of the base assembly may not be installed to reduce the cost of the panel. The embodiment shown in FIGS. 1 and 2 is intended for use with an unwired panel and the center section is omitted. The base assembly includes a pair of base end sections 97, each located at the end of a panel and spaced apart from the other. Each end section 97 includes a pair of elongated, channel-shaped housings 101, each having a top wall 103, a bottom wall 105 and a back wall 107. The channel-shaped housings are fastened together with their back walls abutting to form a base end section 97 having a center dividing wall and open sides. A downwardly-extending lip 108 is formed at the outer edge of each top wall 103 and an upwardly-extending lip 109 is formed at the outer edge of each bottom wall 105. As can be seen most clearly in FIGS. 1 and 8 of the drawings, the back walls 107 do not extend the full length of the end section but terminate short of the outside longitudinal end so as not to interfere with the installation of a leg 111 near the outside longitudinal end of the base end section 97. The leg rests on the bottom walls 105 of the housings 101 and extends through an opening 113 formed in the top walls 103 of the housings 101. The opening 113 is elongated longitudinally inwardly of the leg 111 terminating at the outer end of the back walls 107 and outwardly slightly beyond the leg. This opening provides clearance for the passage of wires from the base assembly 41 into the bottom channel 31 and the vertical end channels 33 of the panel 11, as can be seen in FIGS. 8 and 9, and also permits the panel connector support rails 43 to be contacted by the legs 111. The wires can be extended through the opening 113 into the channel 31 and upwardly outwardly of the bent tab 35, as shown in FIG. 9, into the vertical end channel 33. Upstanding tabs 114 are formed in the top walls 103 at the inside end of the opening 113. These tabs engage the walls of the bottom channel 31 of the panel frame 13 to stabilize the panel 11. An elongated slot 115 is formed in the top wall 103 and bottom wall 105 of each housing 101 adjacent the inside end of each end section 97 to receive fastening tabs to receive a center section 99 which is used when wiring is to be installed in the panel.

The base center section 99, shown in FIGS. 10 to 14, is constructed in a manner similar to an end section 97, but is much longer. It includes a pair of elongated, channel-shaped housings 101A, each having a top wall 103A, a bottom wall 105A and a back wall 107A. The channel-shaped housings are fastened together with their back walls abutting to form a base center section 99. A strengthening fold 116 is formed along the outer edge of each top wall 103A and an upwardly-extending lip 109A is formed at the outer edge of each bottom wall 105A. Upwardly and downwardly-extending tabs 117 are formed in each top wall 103A and bottom wall 105A to be received in the slots 115 formed in the end sections 97 to connect the center section 99 to the end sections 97 of the base assembly in a snap-together arrangement when the center section is telescoped into the end sections. The sections are also held together by one or more screws 118 which extend through openings formed in the end and center sections, as best seen in FIG. 10 of the drawings. However, the primary function of the screw or screws is electrical grounding, not fastening, since the tabs and slots are adequate to connect the center section to the end sections.

Each leg 111 is formed of heavy gauge steel having a generally U-shaped, horizontal cross-section, as can be seen most clearly in FIGS. 7 and 8 of the drawings. Each leg includes an end wall 119, shorter sides walls 121 and an essentially open opposite end wall 123. The end wall 119 faces the outer end of the base assembly 41, while the open end wall 123 faces the interior of the base assembly. The end wall 119 is dimensioned so that it extends above the base assembly and into the end channels 33 of the frame 13 where it is adjacent the panel connector support rail 43. A pair of triangular-shaped, stamped ledges 125 are formed on the end wall 119 to engage and support the panel connector support rail 43 of the frame. The ledges extend through the opening 113 formed in the top walls 103, as shown in FIG. 8. Feet 129 are formed at the bottom of the leg to rest on and are welded to the bottom walls 105 of the base assembly end section 97, as seen in FIGS. 1, 2 and 12 of the drawings. An inturned portion of the end wall forms a bottom of the leg. Outwardly-extending loops 133 are formed in the side walls 121 of the leg. A pair of brackets 135 are formed at the top of the side walls 121 to engage the top wall 103 of the end section 97 of the base assembly 41, as seen in FIGS. 1 and 2 of the drawings. As can also be seen in the drawings, the inner end 123 and top of each leg 111 are open and channel shaped to permit the pull through of wires from the base assembly into the end channels 33 of the panel 11.

A glide 137, shown in FIGS. 1 and 2 of the drawings, is provided in each leg 111 to raise and lower the leg for leveling purposes. Each glide includes a threaded rod 138 which threads into a weld nut 139. A steel reinforcing member 141 having a wall of U-shaped cross-section fits inside the leg 111 and is welded to the end wall 119 of the leg, the bottom walls 105 of the housings 101 and the weld nut 139 to stabilize the threaded rod 138 of the glide. Fasteners 143, shown in FIG. 2, attach the end wall 119 of the leg to the panel connector support rail 43.

When wiring is not to be installed in a panel 11, it is not necessary to provide a center section 99 in the base assembly 41. In such installations, as shown in FIGS. 1 and 2 of the drawings, only base end sections 97 are installed. The end sections provide mounting means at each end of the panel for base panel side covers 155 which extend the full length of the panel. The space between base end sections is left unused.

A horizontal divider partition 141, shown in FIGS. 10 through 13 of the drawings, may be provided for each side of the base assembly 41 formed of end sections 101 and center section 101A to divide the housing into upper and lower raceways for wires. Usually the upper raceway 143 is used for power wiring and the bottom raceway 145 is used for communication wiring. The divider partition 141 is equipped with down-turned tabs 147 at its ends, which tabs fit into the loops 133 formed on the legs 111 to support the partition. Upwardly-extending tabs 149 are also formed on the divider partition to cooperate with downwardly-extending tabs 151 formed in the top wall 103A of the center section 99 of the channel-shaped housing 101. The downwardly and upwardly-extending tabs are furnished with screw holes so that power receptacles and wiring can be fastened to the tabs. Each partition 141 is notched at 153 adjacent the legs 111 to provide access for wires between the upper and lower raceways 143 and 145, respectively. A conventional side cover 155 of the type shown in FIGS. 1 and 2 encloses the outer walls of the channel-shaped housings 101, and these covers are held in place by horizontally-extending spring clips (also not shown) which must be depressed with a screwdriver to release the side covers.

The top channel cap 37, shown in FIGS. 1, 2 and 3 of the drawings, is formed of wood or medium density fiberboard and had metal clips 161 fastened to the underside of the cap at spaced locations along the length thereof. Each clip has an offset elongated portion 163 that extends transversely of the cap. Downwardly-extending, bent tabs 165 at the ends of the elongated portion 163 fit into slots 167 in a horizontally-extending lip 169 formed as part of the top channel 31 to lock the channel ca to the top of the panel.

We claim:

1. An open office system partition panel assembly including:
a base,
a panel located above said base and having a framework,
said framework including interconnected top, bottom and end steel channels,
a core positioned inside said framework,
a covering on each exterior side of the framework in the core,
said top, bottom and end channels intersecting one another to form wire raceways around the periphery of the core, with wire non-sagging transitions between the channels,
the top channel opening outwardly and having a removable cap to permit wires to be laid therein,
said top channel including a pair of upstanding side walls, a laterally-extending lip formed on each side wall thereof, aligned openings formed in said lips along the lengths thereof, an elongated cover to close said top channel, said cover having a plurality of outwardly-extending tabs fitting into said openings in the lips to lock the cover to the top channel,
the end channels opening away from the core and having panel connector support rails closing their openings, and
a leg positioned in said base at opposite ends of said panel, with said legs engaging and supporting said panel connector support rails of said end channels, with said panel connector support rails including bracket standards positioned along the opposite sides of the panel.

2. The panel assembly of claim 1 in which a passage is provided between said base and said end channels adjacent each leg.

3. The panel assembly of claim 1 in which the legs support the base.

4. The panel assembly of claim 1 in which said standards each includes a plurality of aligned and spaced apart rectangular slots for receiving brackets, each standard having raised dimples between said rectangular slots to contact and position the hanger brackets.

* * * * *